(12) United States Patent
Nunnink et al.

(10) Patent No.: US 6,376,855 B1
(45) Date of Patent: Apr. 23, 2002

(54) HORIZONTAL SCANNING DEVICE ABLE TO SCAN A BAR CODE LABEL ON AN UNDERSIDE OR ON A STANDING SIDE WALL OF AN ARTICLE

(75) Inventors: Laurentius Wilhelmus Nunnink; Cornelis Reinier Johannes Schonenberg, both of Amersfoort (NL)

(73) Assignee: Scantech, B.V., Amersfoort (NL)

( * ) Notice: Subject to any disclaimer, the term of this patent is extended or adjusted under 35 U.S.C. 154(b) by 0 days.

(21) Appl. No.: 09/319,148
(22) PCT Filed: Dec. 1, 1997
(86) PCT No.: PCT/NL97/00658
  § 371 Date: Aug. 11, 1999
  § 102(e) Date: Aug. 11, 1999
(87) PCT Pub. No.: WO98/24046
  PCT Pub. Date: Jun. 4, 1998

(30) Foreign Application Priority Data

Nov. 29, 1996 (NL) ............................................. 1004654

(51) Int. Cl.[7] ................................................. G06K 7/10
(52) U.S. Cl. ........................................ 250/566; 250/236
(58) Field of Search ................................. 250/566, 556, 250/234, 235, 236; 235/467, 462.4; 382/312, 318

(56) References Cited

U.S. PATENT DOCUMENTS 5,206,491 A * 4/1993 Katoh et al. ................. 235/467
5,975,418 A * 11/1999 Ishii et al. ............. 235/462.37

* cited by examiner

*Primary Examiner*—Que T. Le
(74) *Attorney, Agent, or Firm*—Bell, Boyd & Lloyd LLC

(57) ABSTRACT

A horizontal scanning device capable of scanning a bar code label on an underside or on a standing side wall of an article is revealed. The device is made of a source of laser light; a rotatably drivable polygonal mirror with mirror surfaces for distributing in scan lines the laser light transmitted by the laser source; a number of fixedly disposed mirrors for reflecting through a window the laser light beam distributed by the polygonal mirror, wherein the polygonal mirror has at least one mirror surface in co-action with a fixedly disposed mirror and at least one laser light beam is directed through the window at the article, which line extends for at least a moment substantially vertically to that window and the projection of which onto the article moves substantially in the plane perpendicular to that window and through that vertical line; and a detector for receiving light scattered by the code.

13 Claims, 9 Drawing Sheets

HORIZONTAL SCANNING DEVICE ABLE TO SCAN A BAR CODE LABEL ON AN UNDERSIDE OR ON A STANDING SIDE WALL OF AN ARTICLE

Horizontally disposed scanning devices for scanning bar codes on articles, for instance in a supermarket, are generally known. For each article the bar codes are arranged at a determined location. In the case such a bar code is arranged on a side wall of an elongate object, it is difficult for the existing, horizontally disposed scanning devices to recognize this code. In practice the article is then tilted and the side wall is passed over the window of the scanning device.

Known from the European patent application EP-A-0 697 674 is a scanning device preferably for disposing in upright position, wherein from a rotatably disposed polygonal mirror scan lines are projected through a window via fixedly disposed mirrors directed at an angle to the vertical.

From the American patent specification U.S. Pat. No. 4,851,667 is known a scanning device for disposing in a lying position, wherein from a rotatable, polygonal mirror scan lines are projected downward onto mirrors disposed roughly horizontally and are projected therefrom out of the housing through a window via mirrors directed upward at an angle.

The present invention provides a scanning device for scanning code on an article through a window, comprising:
  a source of laser light;
  a rotatably drivable polygonal mirror with mirror surfaces for distributing in scan lines the laser light transmitted by the laser source; and
  a number of fixedly disposed mirrors for reflecting through the window scan lines distributed by the polygonal mirror, wherein the polygonal mirror has at least one mirror surface such that in co-action with a fixedly disposed mirror at least one scan line is directed through the window at the article, which line extends for at least a moment substantially vertically to that window and the projection of which onto the article moves substantially in the plane perpendicular to that window and through that vertical line; and
  a detector for receiving light scattered by the code.

Using the horizontally disposed scanning device according to the present invention it becomes possible to recognize bar codes on the articles on both the underside and standing side walls.

Further features of the present invention relate inter alia to the compact construction of such a scanning device as well as to simplified fitting thereof in flush-mounted situation in a table top.

The preferred embodiment of the device according to the present invention to be described hereinbelow is extremely compact, while a dense pattern of scan lines is projected through the window, forming part of which pattern are two substantially vertical lines. Due to a large number of mirror surfaces on the polygonal rotatable mirror, some of which lie eccentrically, or asymmetrically, relative to the optical path from the laser beam to the rotation axis of the rotatable mirror, it becomes possible to arrange in the limited space a large number of fixed mirrors which provide a large number of scan lines. The polygonal mirror, which is light in weight and preferably of injection-moulded plastic with mirror surfaces vapour-deposited thereon, is preferably driven at a high rotation speed, for instance 6000 revolutions per minute, in order to generate the diverse scan lines with a sufficiently large repetition frequency.

BRIEF DESCRIPTION OF DRAWINGS

Further advantages, features and details of the present invention will be elucidated on the basis of the following description with reference to the annexed drawings, wherein.

DETAILED DESCRIPTION OF THE DRAWINGS

Figure 5:
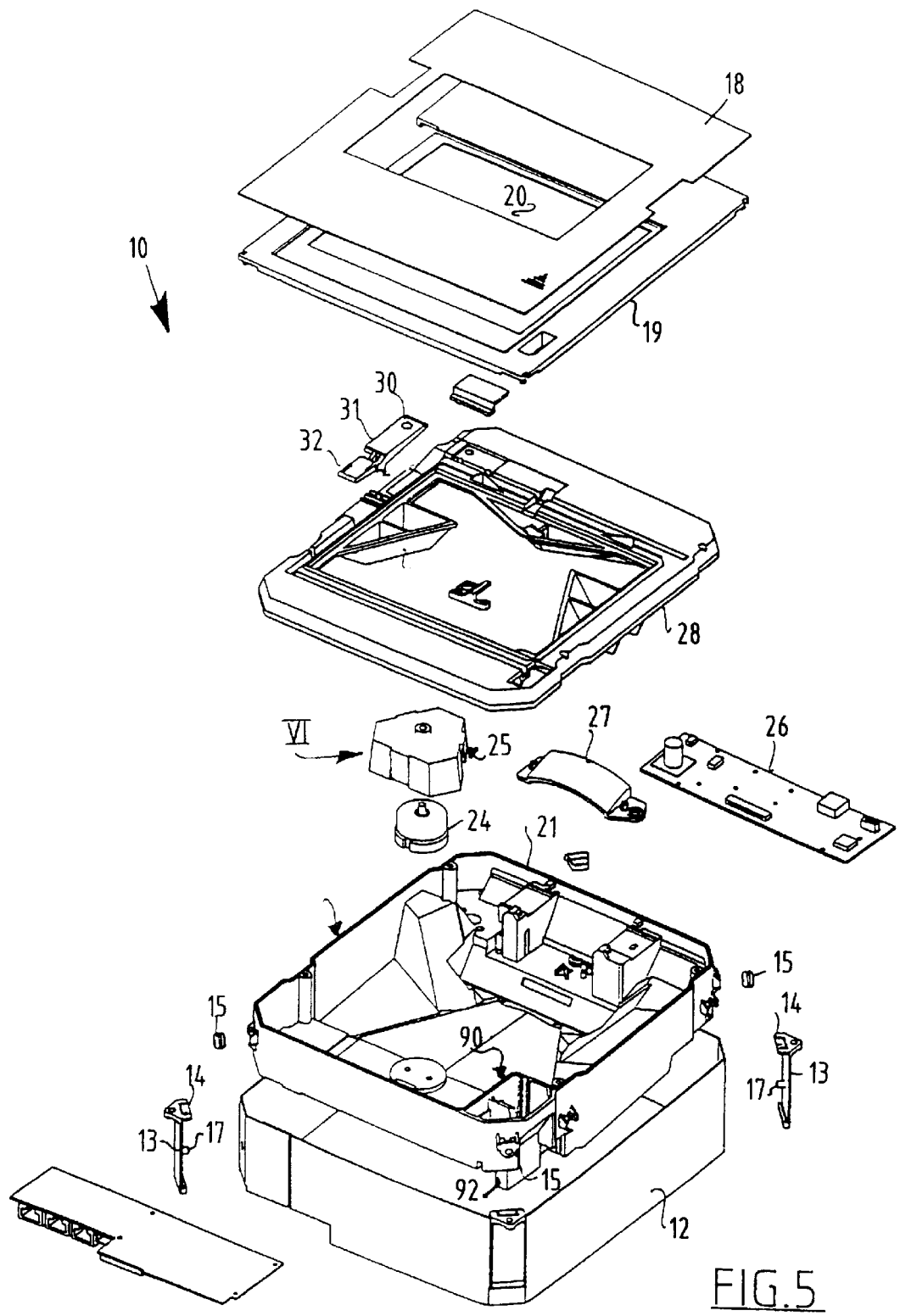
FIG. 5 is an exploded view of the device shown in FIG. 1–4.

A preferred embodiment of a scanning device 10 (FIGS. 1, 5) comprises an outer housing 12 onto which specially formed posts 13 can be fixedly snapped in the chamfered corners. The posts are in one piece and provided with pin parts 17 which protrude into rubber springs for spring-mounted suspension of internal unit 16 in the outer housing 12. Situated underneath a cover plate 18 is a support plate 19 with a window 20, for instance from scratch-resistant material such as sapphire or carbon in diamond-like form. An upper plate 28 provided with a sealing window is screwed fixedly onto inner housing 16. In the inner housing is situated a number of fixedly disposed mirrors 80, 81 etc., in addition to a polygonal mirror 25 drivable using a drive motor 24, in the present embodiment a substantially hexagonal mirror with six main surfaces. In addition to a board 26 on which are arranged electronic components, a laser source and a detector for detecting a laser radiation scattered by a bar code, there is situated in the inner housing a focussing mirror 27 for focussing the scattered laser light on the detector.

Figure 1:
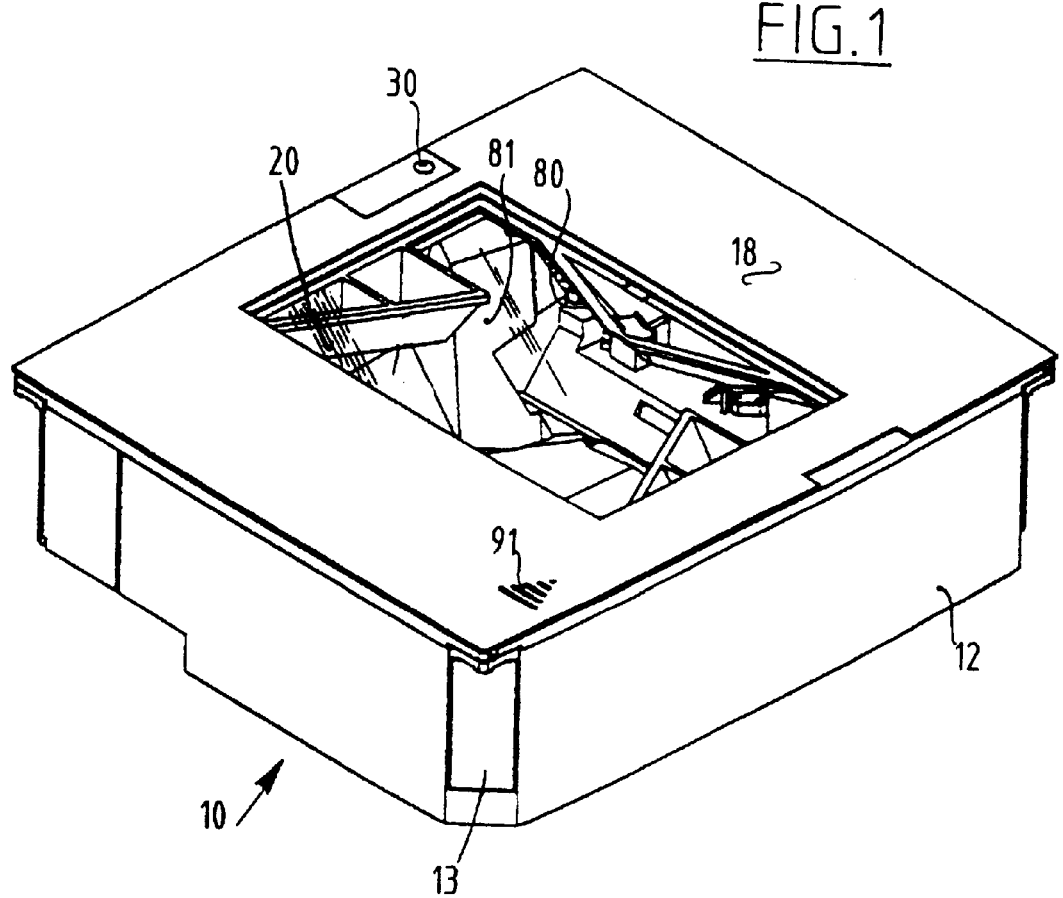
FIG. 1 shows an isometric view of a preferred embodiment of a device according to the present invention.

Further shown in the view of FIG. 1 (and 5) is a switch sensitive to touch, a so-called touch control 30, which starts up the device, i.e. activates it from sleeper mode, when touched by an operative, whereafter the motor for the polygon and the laser light source are respectively switched on and the radiation pattern becomes visible on the window. The touch control 30 is arranged on a lever 31 with a pivot point 32 in which is also accommodated the electrical connection for touch control 30. When touch control 30 is depressed harder, an opposite part of the lever pushes against the underside of window 19 and thus lifts it relative to the base, for instance a table top in which it is flush-mounted. After lifting, the upper part with components 18, 19 and 20 can be taken out of the table top, for instance for servicing purposes.

Figure 2:
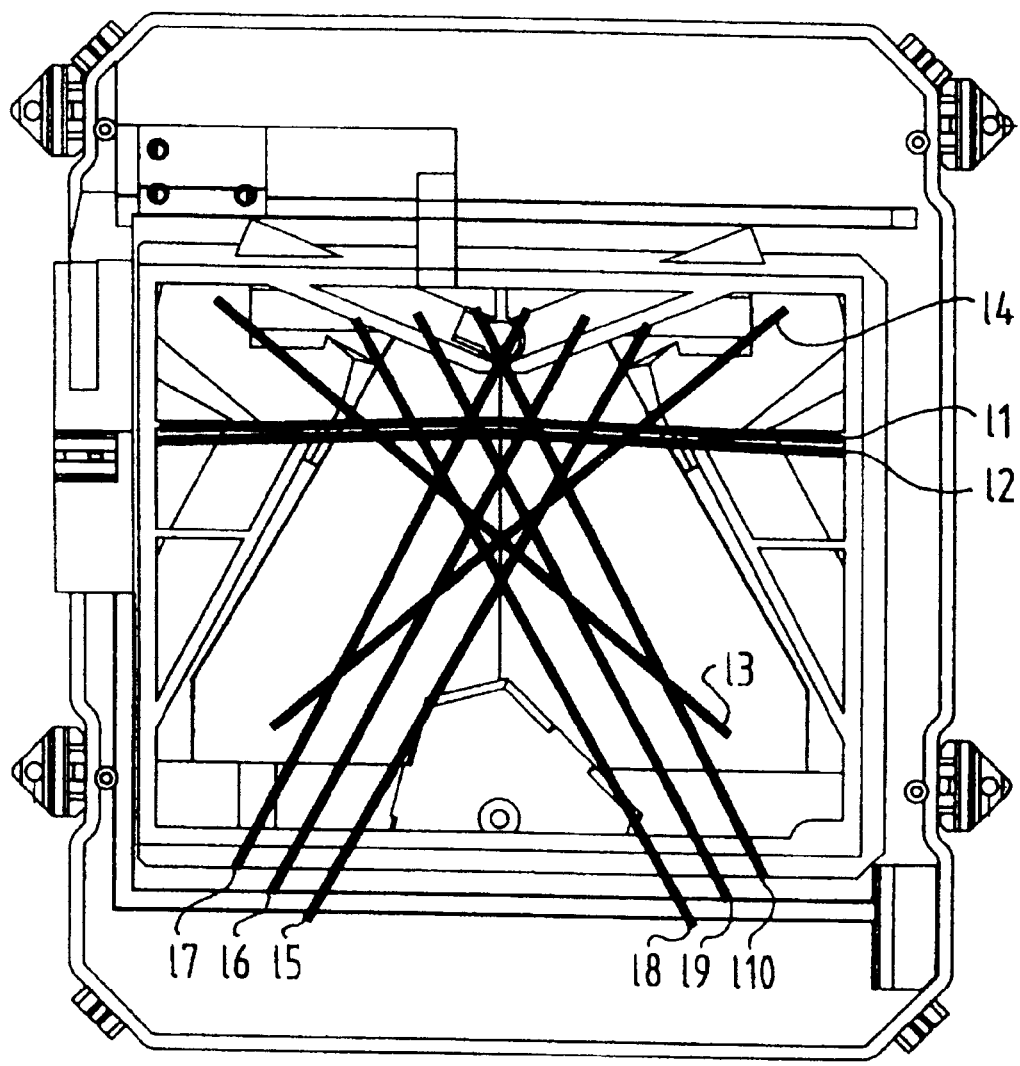
FIG. 2 shows a top view of the interior of the device of FIG. 1.

Shown in FIG. 2 is a scan pattern of ten lines (in effect fifteen) 11, 12, 13, 14, 15, 16, 17, 18, 19, 110, which is projected through the window by the polygonal mirror in co-action with the fixedly disposed mirrors. Shown in the side view of FIG. 3 with arrows A, B, respectively C is the direction of movement of the lines 13, 14 respectively 11 and 12 as vertical projection on an object during movement thereof. The vertical lines 13 and 14 make it possible to recognize the bar code in a first position on a standing side of a relatively high article, such as a container for milk or other liquid, when such an object is moved over the window.

In a position rotated through 90° of the bar code on a standing side, it can be recognized by lines 11 and 12.

It can also be seen that the posts in FIG. 2 are arranged in reverse position on the sides of the inner housing; in this position of the posts the device can be received in an existing apparatus such as scales, wherein the product can be weighed simultaneously with reading of the bar code. The dimensions of the device amount for instance to about 23 cm×22 cm×7 cm. In the case of flush-mounting in a table top, the small installation height ensures that seated operators will not bang their knees against a part of the scanner protruding from the underside of the table top.

Figure 3:
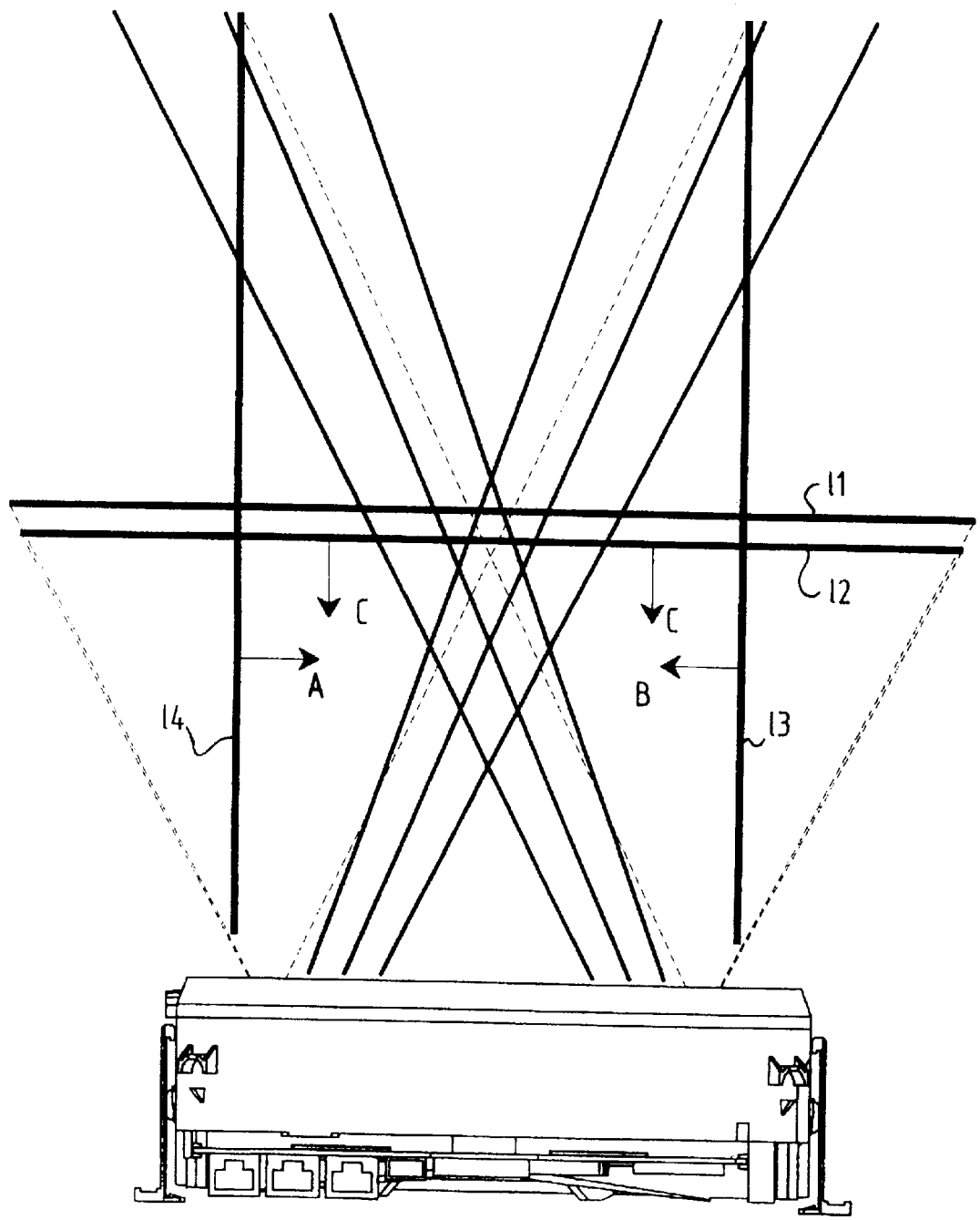
FIG. 3 is a side view of a device from FIG. 1.
Figure 4:
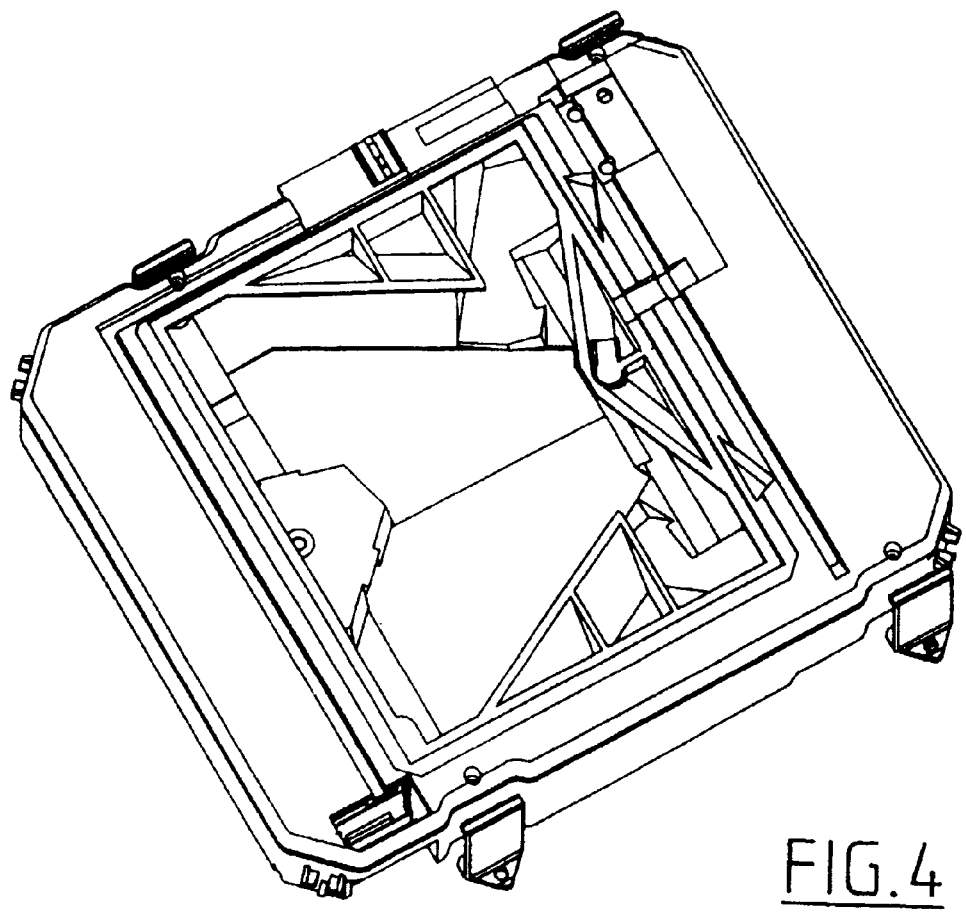
FIG. 4 shows an isometric bottom view of the device shown in FIG. 1–3.
Figure 6:
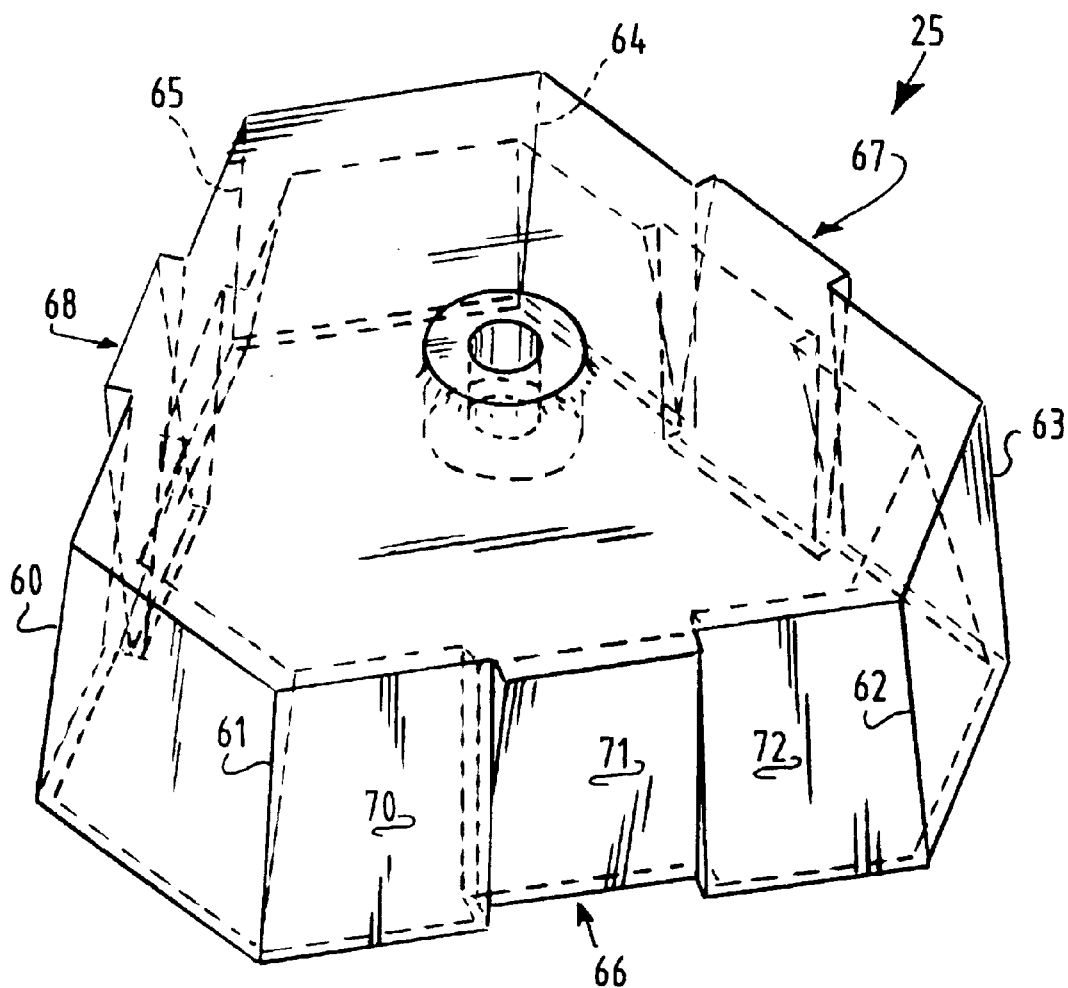
FIG. 6 is an isometric view of detail VI of FIG. 5.

The vertical lines 13 and 14 in FIG. 3 each extend on a side of the window, wherein the path of these lines is co-determined by the shape of the rotating mirror 25, which is shown in more detail in FIG. 6. The rotatable mirror 25 is a hexagon with corner lines 60, 61, 62, 63, 64 and 65, wherein large surfaces 66, 67 and 68 between the corner lines 61 and 62, 63 and 64, respectively 65 and 60 each consist of three part-surfaces, for instance the surface 66 of three part-surfaces 70, 71 and 72, wherein surface 71 is clearly directed at a different angle from surfaces 70 and 72. Surface 71 is situated on the median plane through the whole surface 66, while part-surfaces 70 and 72 are located respectively on the left and right hand side thereof, i.e. eccentrically or asymmetrically.

Figure 7:
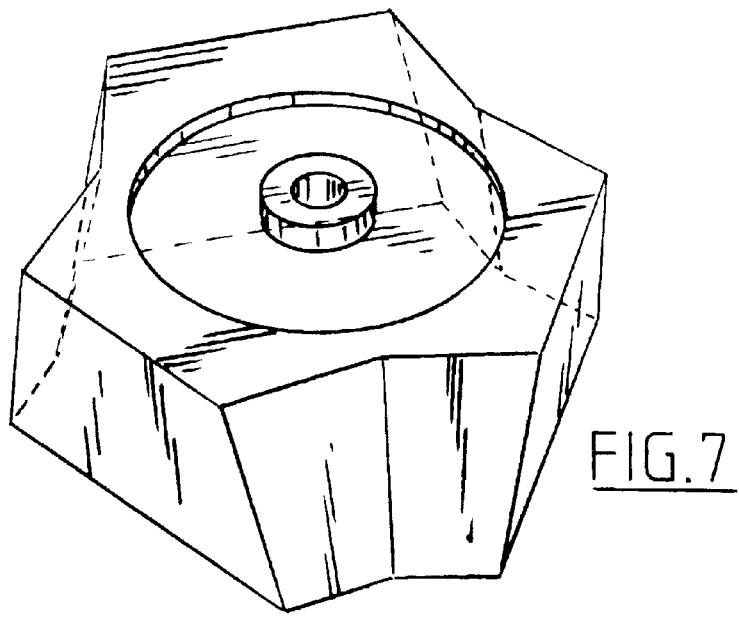
FIGS. 7, 8 and 9 respectively show views of alternative polygonal mirrors as alternative embodiments of the mirror shown in FIG. 6.
Figure 8:
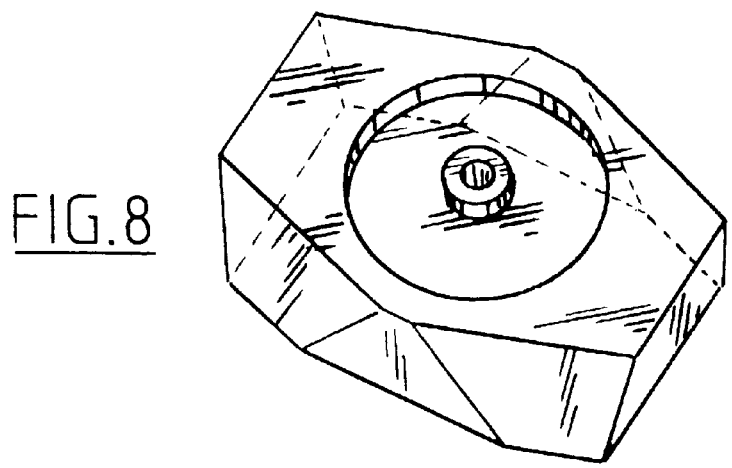
Figure 9:
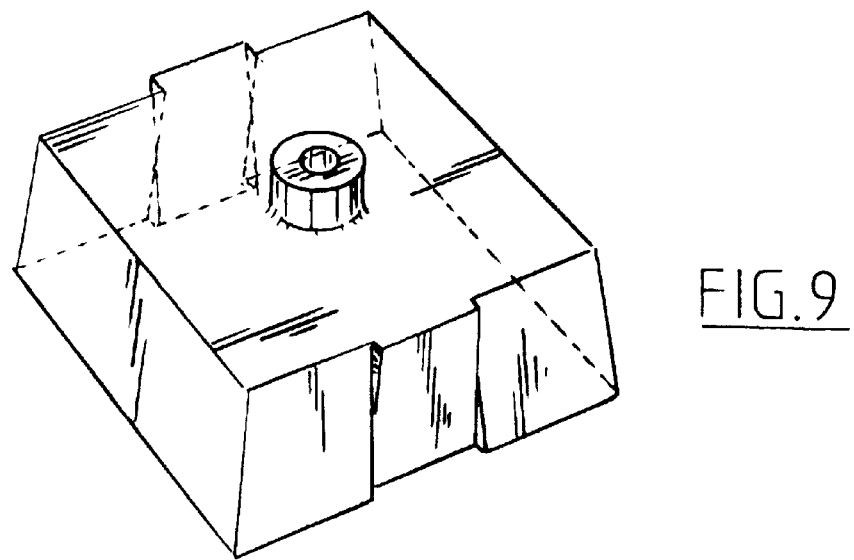

In FIGS. 7, 8 and 9 are shown other embodiments of polygonal rotatable mirrors wherein part-surfaces are situated on the main surfaces to the left and right hand side of the median plane thereon. However, in the chosen preferred embodiment of the scanning device according to the present invention use is made of the polygon shown in FIG. 6, since it has been found possible with this polygon to obtain a compact scanning device with a sufficient number of fixedly disposed mirrors for the desired scan pattern. The obtained preferred embodiment has a height of the inner housing 16 of approximately 7 cm, while the height of the outer housing 12 with top plate is only 5 mm larger.

Figure 10:
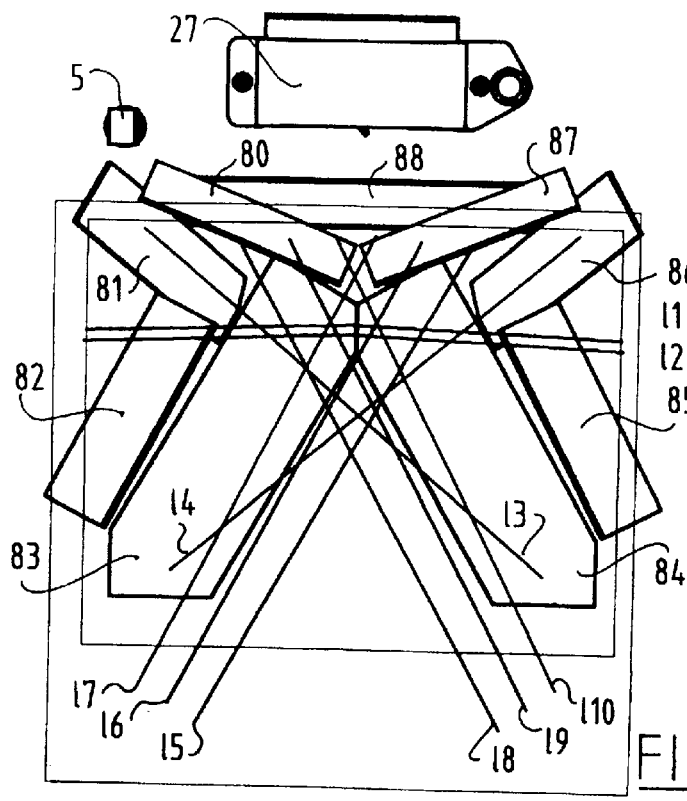
FIGS. 10–13 show schematic views explaining the embodiment wherein the polygonal mirror shown in FIG. 6 co-acts with the fixedly disposed mirrors to obtain the scan patterns shown in FIG. 2 and 3.

In addition to the 10 visible scan lines in the schematic outline in FIG. 2, FIG. 10 also shows a schematic laser source 5 and the collecting mirror 27 for the detector (not shown). While for the sake of clarity the polygonal rotating mirror has been omitted in FIG. 10, fixedly disposed mirrors 80, 81, 82, 83, 84, 85, 86, 87 and 88 are indeed shown herein, which mirrors co-act with different surfaces of the polygonal rotating mirror 25 in the manner to be described below.

Figure 11:
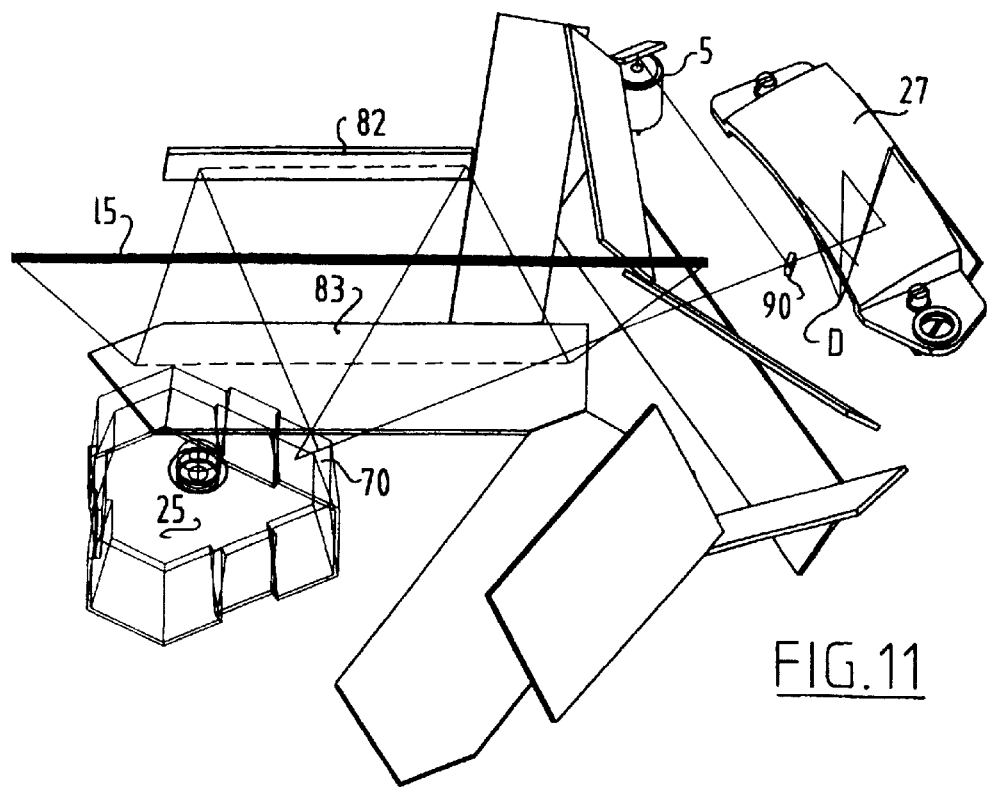

FIG. 11 shows that a laser beam from the laser source impinges on an eccentric mirror surface 70, is reflected therefrom to mirror 82, whereafter via reflection against lying mirror 83 a line such as 15 (or, with corresponding mirror surfaces of the polygonal mirror 25, lines 16 and 17) is formed. Lines 18, 19 and 110 are written via mirrors 85 and 84 (in lying position). The collection of scattered light occurs via the same optical path, except that the returning radiation impinges round optical element 90 via the focussing collecting mirror 27 on the detector (not shown) in point D.

Figure 12:
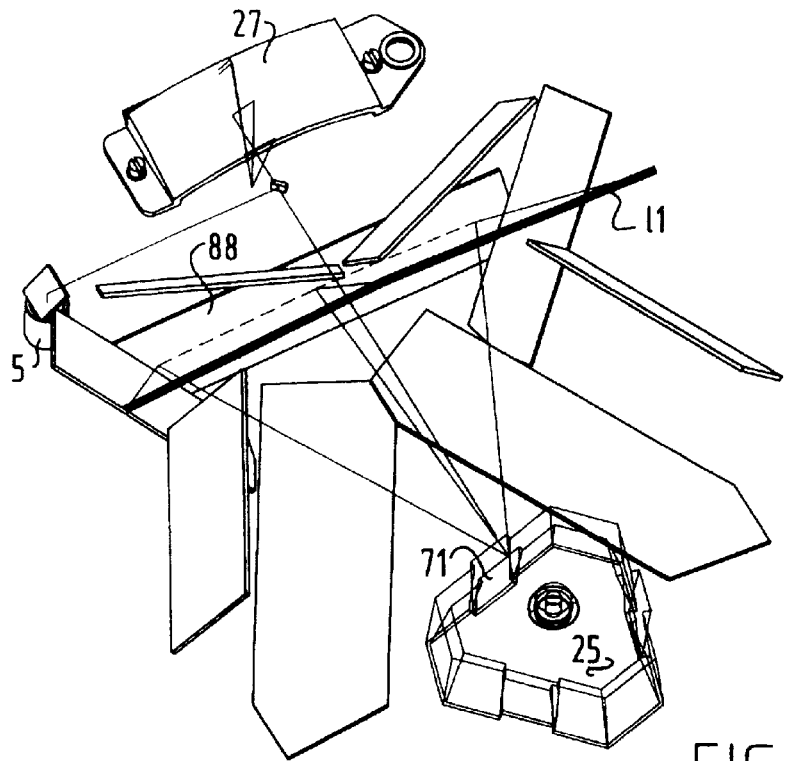

In similar manner scan lines 11 (and 12; in effect three lines) are written by central reflection surfaces such as 71 (FIG. 12) of the polygonal rotating mirror, wherein use is made of the fixed mirror 88.

Figure 13:
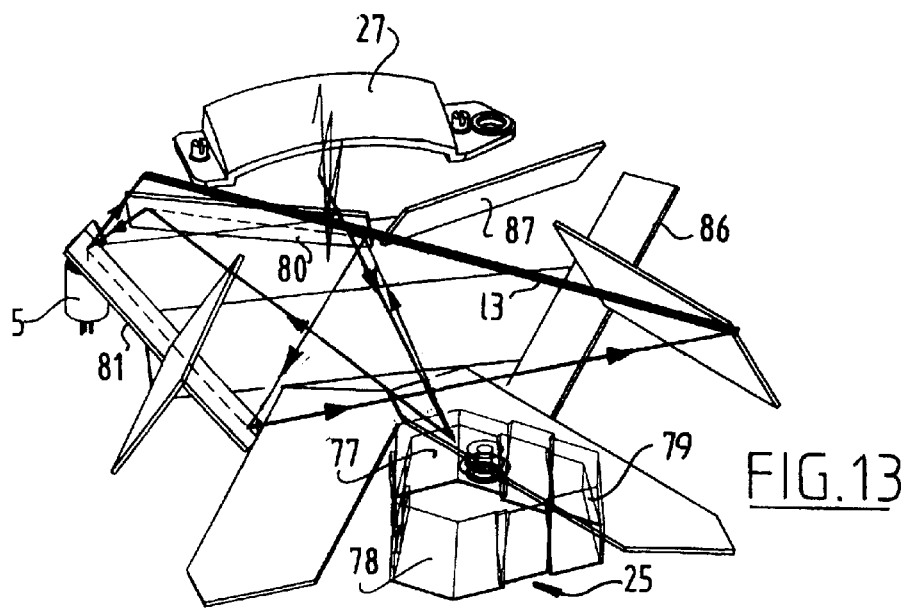

The scan lines 13 (FIG. 13) and 14 are obtained by reflection of the beam transmitted by laser source 5 against the (end surface) mirror surfaces 77, 78 and 79, wherein scan line 13 is written using fixedly disposed mirrors 80 and 81 and scan line 14 is written using fixed mirrors 86 and 87. Fixed mirrors 81 and 86 have an elongate, upright form in this embodiment. Two lines 13 and 14 are therefore written at a time by each of the part-surfaces 77, 78 and 79, which lines are each written three times per rotation of rotatable mirror 25.

The shown and described scan pattern, wherein the projected scan lines are as it were moved toward each other over the article, ensures that a bar code is properly recognized in each of the two positions, i.e. horizontal or vertical, on the standing walls of a block-like article.

Worthy of further mention is that in the preferred embodiment of the device according to the present invention the inner housing 16 (FIG. 5) is provided with a sound-transmitting channel 90, which debouches in a manner not shown in openings 91 (FIG. 1) of the cover plate 18; connected to sound-transmitting channel 90 in a manner not shown is a (small) loudspeaker for generating a sound signal when a code on an article has been recognized. In order to prevent moisture in sound channel 90 it is provided on the underside with an outlet 92 which debouches in the interspace between inner housing 16 and outer housing 12, while the loudspeaker is positioned to the side relative to the vertical sound channel 90 such that moisture or dirt accumulation thereon is avoided.

The present invention is not limited to the above described preferred embodiment; the rights applied for are defined in the first instance by the following claims, within the scope of which many modifications can be envisaged.

What is claimed is:

1. Device for scanning code on an article, comprising:
    a laser source of a laser light beam;
    a rotatably drivable polygonal mirror comprising a main surface with at least two mirror surfaces for distributing in scan lines the laser light beam transmitted by the laser source;
    a first set of fixedly disposed mirrors for reflecting laser light beams originating from the polygonal mirror for directing the laser light beam through a the window at the article, the first set of fixed mirrors being arranged so as the light beams write substantially horizontal scan lines;
    a second set of fixedly disposed mirrors for reflecting laser light beams originating from the polygonal mirror for directing the laser light beam through the window at the article, the second set of fixed mirrors being arranged so as to write substantially vertical scan lines through the window; and
    a detector for receiving light scattered by the code;
    wherein a projection of the laser light beam coming from the second set of fixed mirrors onto an article side surface extending substantially perpendicular to the window moves substantially perpendicular to that window, thereby forming a substantially vertical scan line on the article side surface.

2. Devices claimed in claim 1, wherein the main surface of the polygonal mirror comprises three mirror surfaces.

3. Device according to claim 1, wherein at least two of the mirror surfaces of the main surface of the polygonal mirror are oriented at different angles to the vertical.

4. Device according to claim 1, wherein the laser light beam from a mirror surface of the polygonal mirror reflects consecutively against an upper mirror and a lower mirror, the laser beam sweeping substantially vertically downward or upward over the lower mirror so as to write a vertical scan line on an article to be scanned.

5. Device as claimed in claim 1, further comprising a flat upper plate over which the articles are movable.

6. Device as claimed in claim 1, further comprising an inner housing in which are mounted the laser source, the rotatable mirror, the fixed mirrors and the detector and which is closable in dust-tight manner using a flat upper plate.

7. Device as claimed in claim 6, further comprising an outer housing with suspension means for spring-mounted suspension of the inner housing in the outer housing.

8. Device as claimed in claim 7, wherein the inner housing is provided with rubber spring elements which can be arranged in fitting manner in suspension members of the spring means.

9. Device as claimed in claim 8, wherein the suspension members can be arranged as legs on the inner housing.

10. Device as claimed in claim 1, further comprising a touch-sensitive switch for starting up the device from a sleeper mode.

11. Device as claimed in claim 1, further comprising a lever for lifting the window out of a flush-mounted situation in a table top.

12. Device as claimed in claim 1, further comprising a sound channel in the inner housing which debouches on the one side in the space between the inner housing and the outer housing and which debouches on the other side at sound-transmitting openings in the upper window of the inner housing.

13. A method for scanning a bar code label on an underside or on a standing side wall of an article, comprising the steps of:
   a) passing an article having a bar code label on an underside or on a standing side wall of an article over a device as claimed in claim 1; and
   b) detecting the bar code on the underside or on the standing side wall of the article.

* * * * *